United States Patent
Lim et al.

(10) Patent No.: US 10,313,650 B2
(45) Date of Patent: Jun. 4, 2019

(54) APPARATUS AND METHOD FOR CALCULATING COST VOLUME IN STEREO MATCHING SYSTEM INCLUDING ILLUMINATOR

(71) Applicant: Electronics and Telecommunications Research Institute, Daejeon (KR)

(72) Inventors: Eul Gyoon Lim, Daejeon (KR); Ji Ho Chang, Sejong (KR); Jae Chan Jeong, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 249 days.

(21) Appl. No.: 15/469,223

(22) Filed: Mar. 24, 2017

(65) Prior Publication Data

US 2017/0374339 A1    Dec. 28, 2017

(30) Foreign Application Priority Data

Jun. 23, 2016    (KR) .................. 10-2016-0078768

(51) Int. Cl.
*H04N 13/106* (2018.01)
*H04N 13/257* (2018.01)
(Continued)

(52) U.S. Cl.
CPC ......... *H04N 13/106* (2018.05); *H04N 13/239* (2018.05); *H04N 13/246* (2018.05); *H04N 13/257* (2018.05); *H04N 2013/0081* (2013.01)

(58) Field of Classification Search
CPC .. H04N 13/106; H04N 13/239; H04N 13/246; H04N 13/257; H04N 2013/0081
See application file for complete search history.

(56) References Cited

U.S. PATENT DOCUMENTS

| 8,238,611 B2 | 8/2012 | St Hilaire et al. |
| 2004/0013295 A1* | 1/2004 | Sabe ................. G06K 9/00664 382/153 |

(Continued)

FOREIGN PATENT DOCUMENTS

| JP | 2004-200973 A | 7/2004 |
| KR | 10-1377325 B1 | 3/2014 |
| KR | 10-2016-0015662 A | 2/2016 |

OTHER PUBLICATIONS

Jiao et al.; Local Stereo Matching with Imprioved Matching Cost and Disparity Refinement; Dec. 2014; Peking University Shenzhen Graduate School; pp. 1-17.*

(Continued)

*Primary Examiner* — Peter D Le (57) ABSTRACT

An apparatus and method for calculating a cost volume by controlling an intensity so as to receive relatively less influence from a condition of intensity when capturing a stereo image and changing a parameter for each level according to distance is provided. The apparatus includes an illuminator controller, a pixel expected ratio calculator, and a cost volume calculator, and controls intensity using the illuminator when capturing an object, and calculates a cost volume value so as to receive relatively less influence from distance and intensity when performing stereo matching by changing a parameter used for calculating the cost volume value according to distance to the object and intensity.

8 Claims, 7 Drawing Sheets

(51) Int. Cl.
*H04N 13/246* (2018.01)
*H04N 13/239* (2018.01)
*H04N 13/00* (2018.01)

(56) References Cited

U.S. PATENT DOCUMENTS

| | | | | |
|---|---|---|---|---|
| 2004/0264763 | A1* | 12/2004 | Mas | G01C 23/00 382/154 |
| 2005/0078865 | A1* | 4/2005 | Criminisi | H04N 7/144 382/154 |
| 2005/0201612 | A1* | 9/2005 | Park | G06K 9/00778 382/154 |
| 2006/0029272 | A1* | 2/2006 | Ogawa | G06K 9/32 382/154 |
| 2008/0198924 | A1* | 8/2008 | Ho | H04N 19/597 375/240.01 |
| 2009/0129667 | A1* | 5/2009 | Ho | G06T 15/205 382/154 |
| 2010/0157127 | A1* | 6/2010 | Takayanagi | H04N 5/23212 348/333.02 |
| 2010/0158387 | A1* | 6/2010 | Choi | G06K 9/00228 382/195 |
| 2010/0232510 | A1* | 9/2010 | Ho | H04N 19/597 375/240.16 |
| 2010/0309292 | A1* | 12/2010 | Ho | H04N 13/261 348/47 |
| 2011/0091096 | A1* | 4/2011 | Morris | G03B 19/22 382/154 |
| 2011/0149031 | A1 | 6/2011 | Um et al. | |
| 2011/0317005 | A1* | 12/2011 | Atkinson | G01S 17/023 348/135 |
| 2012/0056982 | A1 | 3/2012 | Katz et al. | |
| 2013/0093843 | A1* | 4/2013 | Chun | H04N 13/00 348/42 |
| 2014/0184584 | A1* | 7/2014 | Reif | G06T 7/593 345/419 |
| 2016/0037121 | A1 | 2/2016 | Chang et al. | |

OTHER PUBLICATIONS

Fusiello et al.; A compact algorithm for rectification of stereo pairs; 2000; Machine Vision and Application; pp. 1-7.*

Kordelas et al.; Enhanced disparity estimation in stereo images; 2015; Image and Vision Computing; pp. 1-31.*

Yoon et al., "Adaptive Support-Weight Approach for Correspondence Search", IEEE Transaction on a Pattern Analysis and Machine Intelligence, Apr. 2006, pp. 650-656, vol. 28, No. 4, IEEE.

Lazaro et al., "Sensor for Distance Measurement Using Pixel Grey-Level Information", Sensors, Nov. 2009, pp. 8896-8906, 2009 No. 9, Molecular Diversity Preservation International, Basel, Switzerland.

Liu et al. "Studey of Three-Dimensional Sensing by Using Inverse Square Law", IEEE Transactions on Magnetics, Mar. 2011, pp. 687-690, vol. 47, No. 3, IEEE.

Liao et al., "Real-Time Light Fall-Off Stereo", IEEE Int. Conf. Image Process 2008, 2008, pp. 1380-1383, IEEE.

* cited by examiner

APPARATUS AND METHOD FOR CALCULATING COST VOLUME IN STEREO MATCHING SYSTEM INCLUDING ILLUMINATOR

CROSS-REFERENCE TO RELATED APPLICATION(S)

This application claims priority from Korean Patent Application No. 10-2016-0078768, filed on Jun. 23, 2016, in the Korean Intellectual Property Office, the disclosure of which is incorporated herein by reference in its entirety.

BACKGROUND

1. Field

The following description relates to technology of calculating a cost volume value needed when matching a stereo image, and more particularly, to an apparatus and method for calculating a cost volume value in a stereo camera system including an illuminator so as to receive relatively less influence from an intensity condition when capturing a stereo image.

2. Description of Related Art

When matching a stereo image captured by a stereo camera, as there is a binocular disparity in an image seen by two eyes of a person, there is also a disparity in an image captured by the stereo camera in which two cameras are arranged in a horizontal direction like the eyes of the person.

Assuming that one of images of the stereo camera is referred to as a reference image and the other image is referred to as a target image, when one point $P_R(x,y)$ in the reference image and one point $P_T(x-d_p,y)$ in the target image are the same point on an object, a disparity of the point $P_R(x,y)$ is represented by $d_p$.

In a stereo matching system, a method of calculating differences between $P_R(x,y)$ and points in a limited range on a target image epipolar line of $P_R(x,y)$, that is, dissimilarities, and selecting a horizontal coordinate difference $d_p$ from a point having the smallest difference as a disparity of the point may be used.

A dissimilarity index is referred to as a cost in a stereo matching system, an absolute value between values of two pixels (an absolute difference) or a sum of the absolute value of a difference between values of the reference point's neighbors and the target point's neighbors (a sum of absolute difference (SAD)), etc. may be used. The cost may be represented as a 3D variable form in regards to image coordinates x and y and a disparity candidate d, and the form may be referred to as a cost volume.

Meanwhile, since values of pixels captured by a camera decrease as the amount of peripheral light is decreased, a general cost obtained based on the difference between the values of the pixels may also decrease as the amount of peripheral light is decreased. In the case of a system including a visible ray light emitting diode (LED) illuminator adjacent to a stereo camera for overcoming an insufficient amount of light at night or a stereo camera system excluding solar light and including an LED illuminator having a specific wavelength, since a cost of a far-away object rapidly decreases in comparison to a cost of a nearby object, it is difficult to identify a far-away part or a part having a small amount of peripheral light when applying the same algorithm to every part of every object, calculating the cost volume value, and performing stereo matching.

SUMMARY

This summary is provided to introduce technology of calculating a cost volume value so as to receive relatively less influence from distance and intensity in a stereo matching system using an illuminator by changing a parameter used for calculating a cost volume value according to distance to an object and intensity.

In one general aspect, an apparatus for calculating a cost volume in a stereo matching system including an illuminator includes: an illuminator controller configured to calculate a pixel intensity ratio of a received stereo image, compare the pixel intensity ratio and a predetermined intensity ratio, generate a general cost volume calculation command or a per-disparity level cost volume calculation command and controls the illuminator; a pixel expected ratio calculator configured to obtain a camera parameter by performing a camera calibration, calculate a disparity value through the obtained camera parameter, and generate an expected intensity ratio of a pixel according to distance for each disparity level from the calculated disparity value; and a cost volume calculator configured to apply a predetermined parameter or different parameters for each disparity level based on the expected intensity ratio of the pixel according to distance for each disparity level according to the received cost volume calculation command for the received image, and calculate a cost volume value.

The illuminator controller may further include: a first comparison controller configured to calculate the pixel intensity ratio of the received image, compare the calculated pixel intensity ratio and the predetermined intensity ratio, control a use of the illuminator when the calculated pixel intensity ratio is smaller than the predetermined intensity ratio, and transmit the general cost volume calculation command and a captured image when the calculated pixel intensity ratio is greater than the predetermined intensity ratio; and a second comparison controller configured to receive an image obtained after using the illuminator when the illuminator is used, calculate a pixel intensity ratio of the received image, compare the calculated pixel intensity ratio and the predetermined intensity ratio, transmit the per-disparity level cost volume calculation command and the received image when the calculated pixel intensity ratio is smaller than the predetermined intensity ratio, and transmit the general cost volume calculation command and the received image when the calculated pixel intensity ratio is greater than the predetermined intensity ratio.

The cost volume calculator may further include: a general cost volume calculator configured to calculate the cost volume by applying a predetermined constant parameter for the image received together with the general cost volume calculation command; and a per-level cost volume calculator configured to calculate the cost volume by applying different parameters for each disparity level using the expected intensity ratio of the pixel according to the distance for each disparity level received for the image received together with the per-level cost volume calculation command.

The pixel expected ratio calculator may further include: a parameter acquisitor configured to obtain a camera parameter including a focal length and a coordinate of a principal point from stereo camera setting information; a disparity calculator configured to calculate the disparity value using the focal length and the coordinate of the principal point included in the obtained camera parameter; and an expected intensity ratio generator configured to generate the expected intensity ratio of the pixel according to distance for each disparity level through the disparity value.

In another general aspect, a method for calculating a cost volume in a stereo matching system including an illuminator includes: calculating a pixel intensity ratio of a received stereo image, comparing the calculated pixel intensity ratio and a predetermined intensity ratio, generating a general cost volume calculation command or a per-disparity level cost volume calculation command, and controlling the illuminator; obtaining a camera parameter by performing a camera calibration, calculating a disparity value through the obtained camera parameter, and generating an expected intensity ratio of a pixel according to distance for each disparity level from the calculated disparity value; and applying a predetermined parameter or different parameters for each disparity level based on the expected intensity ratio of the pixel according to distance for each disparity level according to the received cost volume calculation command for the received image, and calculating a cost volume value.

According to an embodiment of the present invention, the controlling of the illuminator may further include: calculating a pixel intensity ratio of the received image, comparing the calculated pixel intensity ratio and the predetermined intensity ratio, controlling use of the illuminator when the calculated pixel intensity ratio is smaller than the predetermined intensity ratio, and transmitting the general cost volume calculation command and a captured image when the calculated pixel intensity ratio is greater than the predetermined intensity ratio; and receiving an image obtained after using the illuminator when the illuminator is used, calculating a pixel intensity ratio of the received image, comparing the calculated pixel intensity ratio and the predetermined intensity ratio, transmitting the per-disparity level cost volume calculation command and the received image when the calculated pixel intensity ratio is smaller than the predetermined intensity ratio, and transmitting the general cost volume calculation command and the received image when the calculated pixel intensity ratio is greater than the predetermined intensity ratio.

According to an embodiment of the present invention, the calculating of the cost volume value may further include: calculating the cost volume by applying a predetermined constant parameter for the image received together with the general cost volume calculation command; and calculating the cost volume by applying parameters different from each other for each disparity level using the expected intensity ratio of the pixel according to the distance for each disparity level for the image received together with the per-level cost volume calculation command.

According to an embodiment of the present invention, the generating of the pixel expected ratio may further include: obtaining a camera parameter including a focal length and a coordinate of a principal point from stereo camera setting information; calculating a disparity value using the focal length and the coordinate of the principal point included in the obtained camera parameter; and generating the expected intensity ratio of the pixel according to distance for each disparity level through the disparity value.

Other features and aspects will be apparent from the following detailed description, the drawings, and the claims.

Throughout the drawings and the detailed description, the same drawing reference numerals should be understood as referring to the same elements, features, and structures unless otherwise described. The relative size and depiction of these elements may be exaggerated for clarity, illustration, and convenience.

DETAILED DESCRIPTION

Hereinafter, embodiments of the present invention will be described in detail with reference to the accompanying drawings so as to be easily understood by those of ordinary skill in the art. However, the present invention can be implemented in various forms and is not limited to embodiments described herein.

In the accompanying drawings, a description of a part which is not related to the present invention will be omitted in order to clearly describe the present invention, and similar reference numerals are used for similar components throughout the specification.

Throughout the specification, when one component is described as "comprising" or "including" another component, the terms do not have a meaning which excludes another component but have a meaning which may further include another component unless specifically described otherwise.

Hereinafter, an apparatus and method for calculating a cost volume in a stereo matching system including an illuminator according to an embodiment of the present invention will be described with reference to the accompanying drawings.

Figure 1:
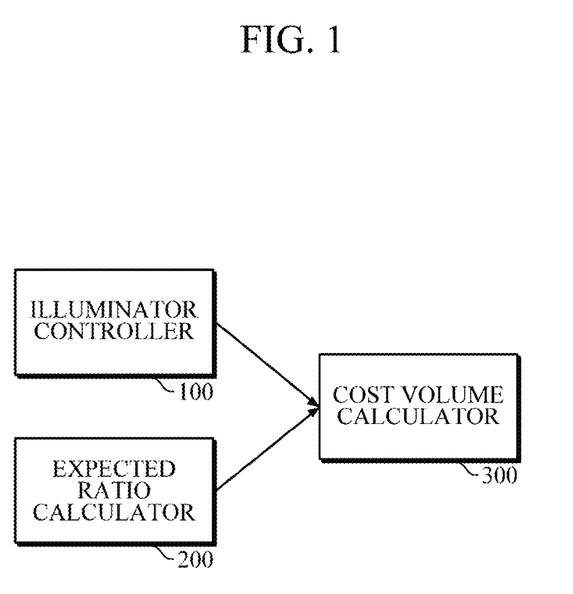
FIG. 1 is a diagram illustrating an apparatus for calculating a cost volume in a stereo matching system including an illuminator according to an embodiment of the present invention.

FIG. 1 is a diagram illustrating an apparatus for calculating a cost volume in a stereo matching system including an illuminator according to an embodiment of the present invention.

Referring to FIG. 1, the apparatus for calculating a cost volume in a stereo matching system including an illuminator may include an illuminator controller 100, a pixel expected ratio calculator 200, and a cost volume calculator 300.

The illuminator controller 100 may calculate a pixel intensity ratio of a received stereo image, compare the calculated pixel intensity ratio and a predetermined intensity ratio, generate a general cost volume calculation command or a per-disparity level cost volume calculation command, and control the illuminator.

The illuminator controller 100 will be described in more detail with reference to FIG. 2.

The pixel expected ratio calculator 200 may perform camera calibration, obtain a camera parameter, calculate a disparity value using the obtained camera parameter, and generate an expected intensity ratio of a pixel according to distance for each disparity level from the calculated disparity value.

The pixel expected ratio calculator 200 will be described in more detail with reference to FIG. 3.

The cost volume calculator 300 may receive the stereo image and the cost volume calculation command, apply a predetermined parameter or different parameters for each disparity level according to the received expected intensity ratio based on each distance according to the received cost volume calculation command for the received image, and calculate a cost volume value.

The cost volume calculator 300 will be described in more detail with reference to FIG. 4.

Figure 2:
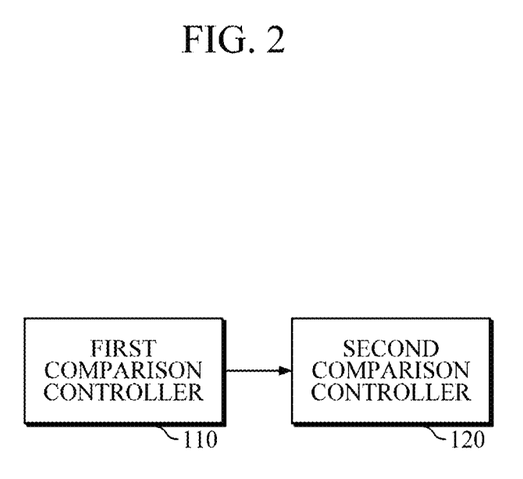
FIG. 2 is a detailed diagram illustrating an illuminator controller shown in FIG. 1.

FIG. 2 is a detailed diagram illustrating an illuminator controller 100 shown in FIG. 1.

Referring to FIG. 2, the illuminator controller 100 may include a first comparison controller 110, and a second comparison controller 120.

The first comparison controller 110 may calculate the pixel intensity ratio of the received image, compare the calculated pixel intensity ratio and the predetermined intensity ratio, control use of the illuminator when the calculated pixel intensity ratio is smaller than the predetermined intensity ratio, and transmit the general cost volume calculation command and the captured image when the calculated pixel intensity ratio is greater than the predetermined intensity ratio.

According to an embodiment of the present invention, the received image may refer to an image captured through a stereo camera including an infrared ray (IR) narrow band pass filter.

According to an embodiment of the present invention, a necessity for application of an algorithm considering an illuminator of an image may be determined by a ratio of the number of pixels with a brightness of a reference intensity or less and the total number of pixels included in the image.

For example, when the total number of pixels is 100 and the reference light intensity is 10 of a maximum value of 255, when the number of pixels with the reference brightness 10 or less is assumed to be 60, the algorithm may be determined as being needed since a ratio of a dark portion is 60% to the overall image.

Here, a predetermined reference light intensity and the ratio may be freely changed as a value which is preset by a user.

According to an embodiment of the present invention, a control of use of the illuminator may refer to an operation of controlling an illuminator installed in the stereo camera so as to provide a sufficient amount of light to the illuminator connected to the apparatus for calculating the cost volume when capturing a stereo image.

According to an embodiment of the present invention, the general cost volume calculation command may refer to a command for applying a method of applying a constant parameter value to a predetermined cost volume calculation equation and calculating the cost volume since most objects are suitably illuminated when a calculated intensity ratio of an image is greater than the predetermined intensity ratio, that is, the ratio of the dark portion in the image to the overall image is smaller than the reference ratio and it is not necessary to use a method of calculating a cost volume for each disparity level, and it may be transmitted to the cost volume calculator 300 with the captured image data.

The second comparison controller 120 may receive a recaptured image using the included illuminator when an image is recaptured, calculate a pixel intensity ratio of the recaptured image, compare the calculated pixel intensity ratio and the predetermined intensity ratio, transmit the cost volume calculation command for a disparity level and the recaptured image when the calculated pixel intensity ratio is smaller than the predetermined intensity ratio, and transmit the general cost volume calculation command and the recaptured image when the calculated pixel intensity ratio is greater than the predetermined intensity ratio.

According to an embodiment of the present invention, the per-disparity level cost volume calculation command may refer to a command for calculating the cost volume by applying different parameters for each disparity level to the predetermined cost volume calculation equation based on the expected intensity ratio of a pixel according to distance to each disparity level since an amount of light is not sufficient compared to a distance to a far-away object when the calculated pixel intensity ratio of the image is smaller than the predetermined intensity ratio and it is necessary to use a method of calculating a cost volume for each disparity level, and it may be transmitted to the cost volume calculator 300 with the captured image data.

Here, the cost volume calculation method for each disparity level will be described in more detail with reference to FIG. 4.

Figure 3:
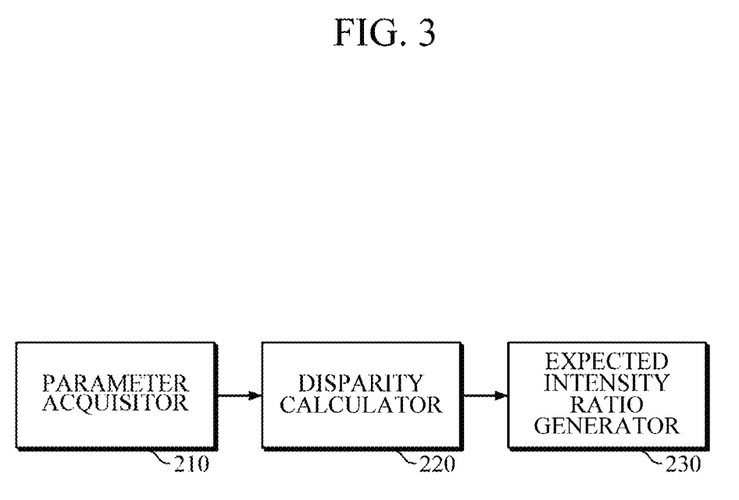
FIG. 3 is a detailed diagram illustrating a pixel expected ratio calculator shown in FIG. 1.

FIG. 3 is a detailed diagram illustrating a pixel expected ratio calculator 200 shown in FIG. 1.

Referring to FIG. 3, the pixel expected ratio calculator 200 may include a parameter acquisitor 210, a disparity calculator 220, and an expected intensity ratio generator 230.

The parameter acquisitor 210 may obtain a camera parameter including a focal length and a coordinate of a principal point from stereo camera setting information.

Here, the principal point may be the center of a photograph, and may refer to a meeting point of a vertical line which is drawn from a projection center to a projection surface and the projection surface.

Further, the focal length may refer to a distance which is from the principal point to a focal point.

According to an embodiment of the present invention, a horizontal position of the principal point of the camera may be changed in a virtual horizontal axis to maximally secure an effective image, and in this case, may be compensated for by reflecting a difference of the principal position in a disparity value which will be calculated later for the change.

According to an embodiment of the present invention, distortion cancellation and stereo adjustment may be performed on the obtained image using the camera parameter.

The disparity calculator 220 may calculate a disparity value using the focal length and a coordinate of the principal point included in the obtained camera parameter.

A relationship between a distance z which is from a virtual horizontal axis camera to a pixel on an object and a disparity value d may be expressed by the following Equation 1 using a focal length f of the virtual horizontal axis camera and a distance B (mm as a unit) between principal points of two cameras.

$$z = z(d_{actual}) = z(d + d_{comp}) = \qquad \text{[Equation 1]}$$

-continued $$\frac{f[\text{pixel}] \cdot B[\text{mm}]}{(d + d_{comp})[\text{pixel}]}[\text{mm}] = \frac{f[\text{pixel}] \cdot B[\text{mm}]}{1000(d + d_{comp})[\text{pixel}]}[\text{m}]$$

According to an embodiment of the present invention, when the compensated for disparity value is 0, every distance (including infinity) which is farther than a position in which the compensated for disparity value is 1 may be included, and the closest distance may be determined by a disparity search range.

The expected intensity ratio generator 230 may generate an expected intensity ratio of a pixel according to distance for each disparity level for each disparity value.

According to an embodiment of the present invention, the expected intensity ratio of the pixel according to distance for each disparity level may be obtained by the following Equation 2.

$$E(I_d) = \frac{1}{\left(\frac{z(d_{actual})}{z_r}\right)^2} = \frac{1}{\left(\frac{z(d + d_{comp})}{z_r}\right)^2} \quad [\text{Equation 2}]$$

An expected ratio $E(I_d)$ of a pixel value $I_d$ for each disparity value d may be calculated using Equation 2 and a distance corresponding to a disparity.

Equation 2 may be deduced by setting a radiation intensity value as 1 at a reference distance $z_r$ and applying the inverse square law using a ratio of a reference distance.

Figure 4:
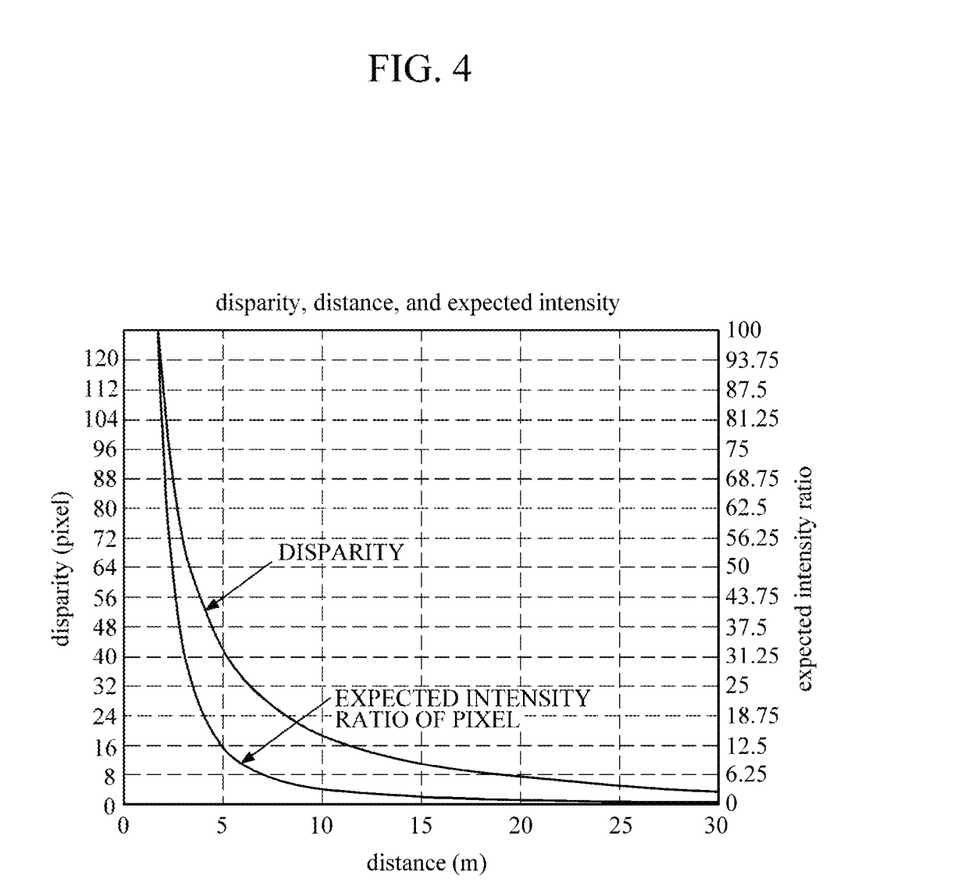
FIG. 4 is a diagram illustrating a graph of an expected intensity ratio for each pixel according to distance for each disparity level generated according to an embodiment of the present invention.

According to an embodiment of the present invention using Equation 2, a relationship between a disparity distance and the expected intensity ratio (%) for each pixel may be represented by a graph shown in FIG. 4.

FIG. 4 is a diagram illustrating a graph regarding an expected intensity ratio of a pixel according to distance for each disparity level generated according to an embodiment of the present invention.

Referring to FIG. 4, when the focal length f is 1556, the distance B between the principal points of two cameras is 148. 81, a maximum disparity is 127, a principle position compensation value is $d_{comp}$=4.4638, and $z_r$=z(127)=1.7613 m, the expected intensity ratio of the pixel according to distance for each disparity level may be calculated as shown in a graph of FIG. 4.

Figure 5:
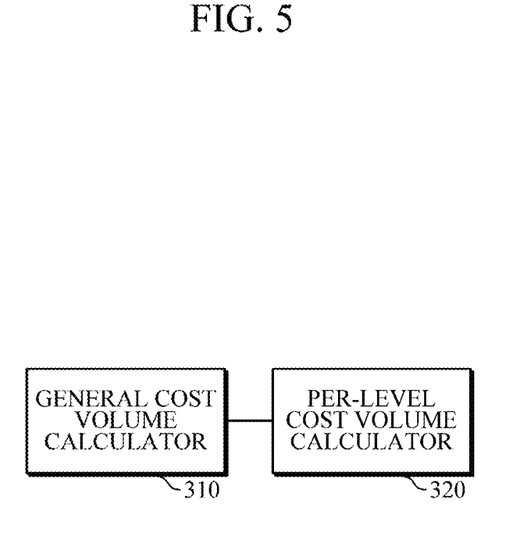
FIG. 5 is a detailed diagram illustrating a cost volume calculator shown in FIG. 1.

FIG. 5 is a detailed diagram illustrating the cost volume calculator 300 shown in FIG. 1.

Referring to FIG. 5, the cost volume calculator 300 according to an embodiment of the present invention may include a general cost volume calculator 310, and a per-level cost volume calculator 320.

The general cost volume calculator 310 may calculate a cost volume using a constant parameter which is previously set for an image received with a general cost volume calculation command.

According to an embodiment of the present invention, the cost volume may be calculated through a support weight method for each pixel using a bilateral filter in order to calculate the cost volume using the constant parameter by the following Equation 3.

$$C_{aggr}(x, y, d) = \quad [\text{Equation 3}]$$

$$C_{aggr}(p, d) = \frac{\sum_{\substack{q(u,v) \\ x-\sigma_p \leq u \leq x+\sigma_p \\ y-\sigma_p \leq v \leq y+\sigma_p}} \{G_{\sigma_p}(\|p - q\|) G_{\sigma_r(d)}(|I_p - I_q|) C(q, d)\}}{\sum_{\substack{q(u,v) \\ x-\sigma_p \leq u \leq x+\sigma_p \\ y-\sigma_p \leq v \leq y+\sigma_p}} \{G_{\sigma_p}(\|p - q\|) G_{\sigma_r(d)}(|I_p - I_q|)\}}$$

$$G_\sigma(x) = \frac{1}{\sigma\sqrt{2\pi}} \exp\left(-\frac{x^2}{2\sigma^2}\right)$$

According to an embodiment of the present invention using a general cost calculation method, a color difference parameter $\sigma_r$ may be a predetermined specific value and use a constant value regardless of a change of disparity.

The per-level cost volume calculator 320 may calculate the cost volume using different parameters for each disparity level using the expected intensity ratio of the pixel according to distance for each disparity level on the image received with the per-level cost volume calculation command.

According to an embodiment of the present invention, the cost volume may be calculated through a support weight method for each pixel using a bilateral filter using Equation 3 to calculate the cost volume using different parameters for each disparity.

Here, unlike a general cost volume calculation method, the color difference parameter $\sigma_r$ may be applied differently as a function $\sigma_r(d)$ according to the disparity level.

According to an embodiment of the present invention, the function $\sigma_r(d)$ may be the following Equation 4.

$$\sigma_r(d) = \sigma_{optimal} * E(I_{d+1}) = \frac{\sigma_{optimal}}{\left(\frac{z(d + 1 + d_{comp})}{z_r}\right)^2} \quad [\text{Equation 4}]$$

Here, the reason for using $E(I_{d+1})$ instead of $E(I_d)$ is an expected intensity ratio $E(I_{d=0})$ which is infinitely distant is 0.

Referring to Equation 4, $\sigma_r(d)$ may basically be proportional to the expected intensity ratio (0 to 1) of the pixel.

Further, when using a cost plane in which the disparity value is 0, since the disparity value of 0 corresponds to a distance which is considerably distant even when considering $d_{comp}$, pixels matched to the disparity value may have a very low pixel value on average, and a difference of pixel values of different objects which are located distantly may be considerably small.

Further, according to an embodiment of the present invention, $\sigma_{optimal}$ may be an optimal value for an object which is located at the distance which is mainly used.

When substituting Equation 4 into Equation 3, a weight of a raw cost value $C(q,d)$ between p and an adjacent point q may be greatly reflected even in a small value of $|I_p - I_q|$ when the disparity value is small, and a slight difference between objects which rapidly darken may be properly reflected as a distance from the light source increases.

According to the embodiment of using a per-level cost volume calculation method, a high identification rate may be obtained even when the disparity value is great because aggregating a cost plane having a great disparity is an operation of identifying an object located at a nearby position and an expected intensity ratio of pixels to be matched is increased.

Generally, since complimentary metal-oxide semiconductor (CMOS) image sensors have a level characteristic of photon shot noise which is proportional to the amount of light, a noise level may be increased as the object is brightly captured.

Accordingly, a nearby object which is relatively brightly captured may include much more noise in comparison to a far-away object. According to the present invention, a method of limiting brightness of a reference image pixel may additionally be used when aggregating by considering the far-away object to reduce an influence of the noise included in the nearby object which is brightly captured. For example, a method of integrally decreasing a brightness of a pixel which is captured to have a brightness which is any more than a predetermined limit in comparison to the expected intensity light ratio $E(I_d)$ of the pixel which can be expected in the disparity level d which is currently aggregated may be represented by the following Equation 5.

$$\overline{I(x,y,d)} = \min(I(x,y), a \cdot E(I_{d+1}) + b) \quad \text{[Equation 5]}$$

In Equation 5, $E(I_{d+1})$ may be used instead of $E(I_d)$ for the same reason described above.

b may be a positive value determined by considering a distribution of normal pixel values according to a texture of a far-away object in which the expected intensity ratio is close to 0. When the pixel value is represented by 8 bits, b may be a small value which is about 2.

According to an embodiment of the present invention, a may be a proportional constant for a short distance which can expect a much brighter value, a function of converting within a range of a pixel value may be performed since the expected intensity ratio has a value between 0 and 1, and for example, when limiting to 120% of the expected intensity ratio for most intervals of the expected intensity ratio is desired, a may have a value of about 255*1.2=306 when the pixel value is represented by 8 bits.

According to an embodiment of the present invention, when aggregating as shown in the following Equation 6 by using an image $\overline{I(x,y,d)}$ in which brightness is limited by the reference image based on the expected intensity ratio, an effect of suppressing a matching error due to the noise included in the pixel of the nearby object having a low possibility to be matched may be obtained.

[Equation 6]

$$C_{aggr}(x, y, d) =$$

$$C_{aggr}(p, d) = \frac{\displaystyle\sum_{\substack{q(u,v) \\ x-\sigma_p \leq u \leq x+\sigma_p \\ y-\sigma_p \leq v \leq y+\sigma_p}} \{G_{\sigma_p}(\|p-q\|) G_{\sigma_r(d)}(|\overline{I_p(d)} - \overline{I_q(d)}|) C(q, d)\}}{\displaystyle\sum_{\substack{q(u,v) \\ x-\sigma_p \leq u \leq x+\sigma_p \\ y-\sigma_p \leq v \leq y+\sigma_p}} \{G_{\sigma_p}(\|p-q\|) G_{\sigma_r(d)}(|\overline{I_p(d)} - \overline{I_q(d)}|)\}}$$

Only if, $\overline{I(x,y,d)} = \min(I(x,y), a \cdot E(I_{d+1}) + b)$ (a>0, b>0)

Figure 6:
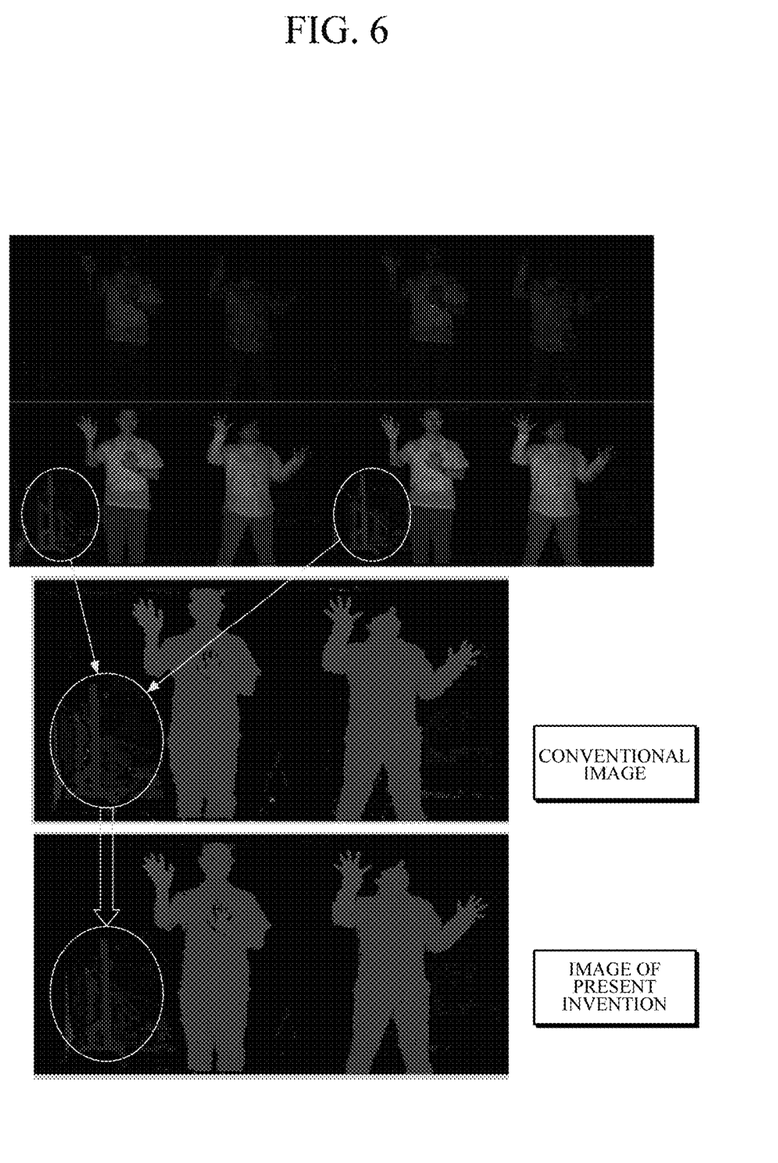
FIG. 6 is a diagram illustrating a comparison between an image in which stereo matching is performed using a cost volume calculated according to an embodiment of the present invention and an image in which stereo matching is performed using a cost volume calculated according to a conventional method.

FIG. 6 is a diagram illustrating a comparison between an image in which stereo matching is performed using a cost volume calculated according to an embodiment of the present invention and an image in which stereo matching is performed using a cost volume calculated according to a conventional method.

Referring to FIG. 6, the image in which stereo matching is performed using the cost volume according to an embodiment of the present invention and the image in which stereo matching is performed using the cost volume according to the conventional method are illustrated.

The image in which stereo matching is performed using the cost volume according to an embodiment of the present invention shown in FIG. 6 may use the expected intensity ratio of the graph of the expected intensity ratio for each pixel according to distance for each disparity level shown in FIG. 4, apply $\sigma_r(d)$ limiting the brightness of a pixel having a brightness which is 20% or more in comparison to the disparity level expected ratio, and calculate the cost volume value, and thus a contour of an object in the image in which stereo matching is performed using the cost volume value may be relatively improved compared to that in the image in which stereo matching is performed using the calculated cost volume according to the conventional method.

Figure 7:
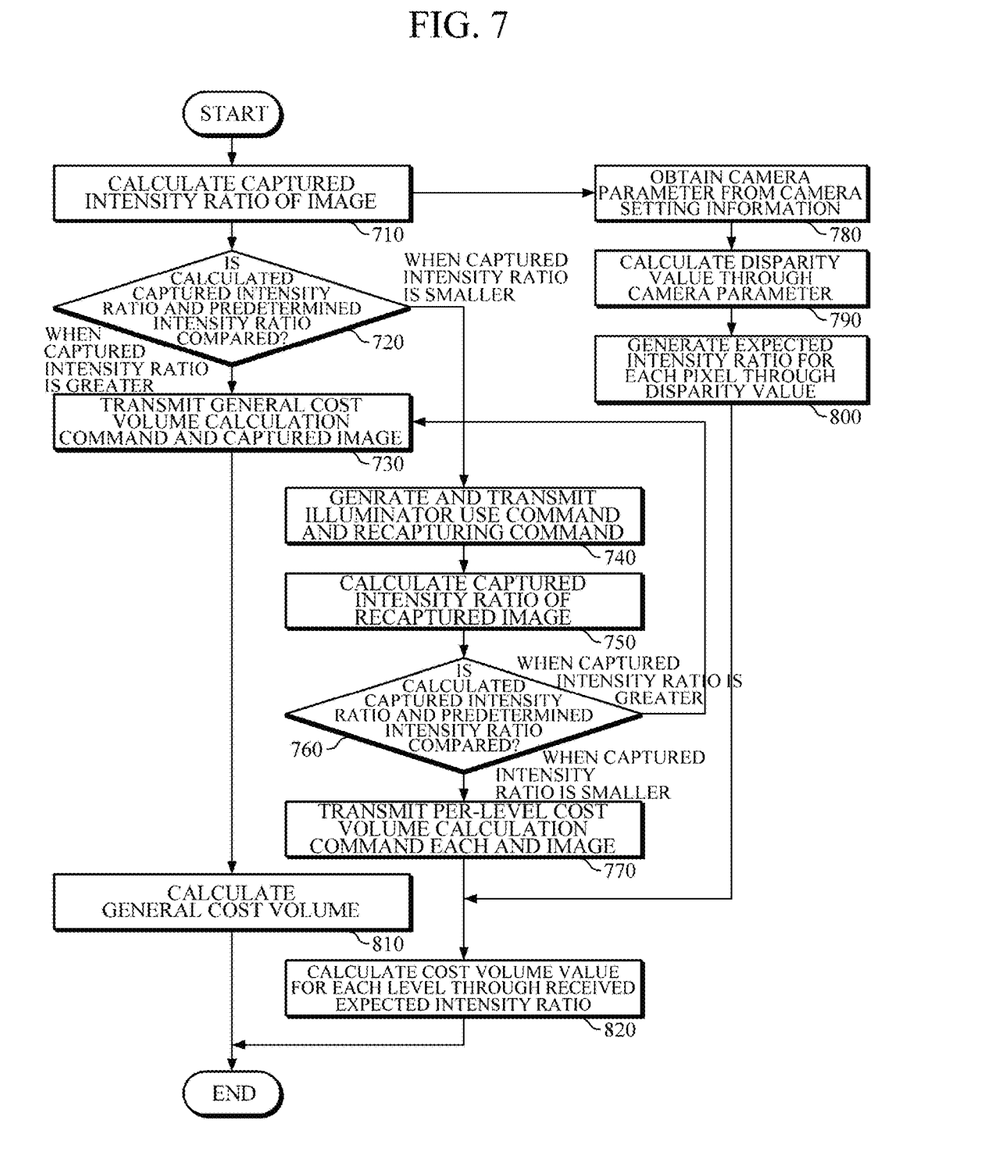
FIG. 7 is a flowchart illustrating a cost volume calculation method in a stereo matching system including an illuminator according to an embodiment of the present invention.

FIG. 7 is a flowchart illustrating a method for calculating a cost volume in a stereo matching system including an illuminator according to an embodiment of the present invention.

A pixel intensity ratio of an image may be calculated (710).

According to an embodiment of the present invention, a received image may refer to an image captured by a stereo camera including an IR narrow band pass filter.

According to an embodiment of the present invention, the pixel intensity ratio of the image may be calculated by a ratio of the number of pixels which are a reference brightness or less and the total number of pixels included in the image.

The calculated pixel intensity ratio may be compared to a predetermined intensity ratio (720).

According to an embodiment of the present invention, whether the calculated pixel intensity ratio is relatively greater or smaller than the predetermined intensity ratio may be determined by comparing the calculated pixel intensity ratio of the image and the predetermined intensity ratio.

Here, the predetermined intensity ratio and the reference brightness may be values which are previously set by a user, and they may be freely changed.

A general cost volume calculation command and a captured image may be transmitted (730).

When the calculated pixel intensity ratio and the predetermined intensity ratio are compared and the calculated pixel intensity ratio is greater than the predetermined intensity ratio, the general cost volume calculation command and the captured image may be transmitted.

According to an embodiment of the present invention, the general cost volume calculation command may refer to a command for applying a method of calculating a cost volume using a constant parameter value since it is not necessary to use a method of calculating a cost volume for each disparity level due to a sufficient amount of light when the calculated pixel intensity ratio of the image is greater than the predetermined intensity ratio, and it may be transmitted with the captured image.

An illumination use command may be generated and transmitted (740).

According to an embodiment of the present invention, when the calculated pixel intensity ratio and the predetermined intensity ratio are compared and the calculated pixel intensity ratio is smaller than the predetermined intensity ratio, the illumination use command may be generated and transmitted.

According to an embodiment of the present invention, the illumination use command may refer to a control command for controlling an illuminator so as to provide a sufficient amount of light to the illuminator connected to the apparatus for calculating the cost volume when capturing a stereo image.

The pixel intensity ratio of a recaptured image may be calculated (750).

According to an embodiment of the present invention, when the illumination use command is transmitted, an image obtained after using the illuminator may be received and a pixel intensity ratio of the received image may be calculated.

The calculated pixel intensity ratio and the predetermined intensity ratio may be compared (760).

According to an embodiment of the present invention, the calculated pixel intensity ratio and the predetermined intensity ratio may be compared, a per-disparity level cost volume calculation command and the recaptured image may be transmitted when the calculated pixel intensity ratio is smaller than the predetermined intensity ratio, and the general cost volume calculation command and the recaptured image may be transmitted when the calculated pixel intensity ratio is greater than the predetermined intensity ratio.

A per-level cost volume calculation command and the image may be transmitted (770).

According to an embodiment of the present invention, the per-level cost volume calculation command may refer to a command for applying a method of calculating a cost volume using different parameters for each disparity level and the predetermined cost volume calculation equation based on the expected intensity ratio of the pixel according to distance for each disparity level since an amount of light is not sufficient and it is necessary to use the method of calculating a cost volume for each disparity level when the calculated pixel intensity ratio of the image is smaller than the predetermined intensity ratio, and it may be transmitted with the captured image data.

A camera parameter may be obtained from camera setting information (780).

According to an embodiment of the present invention, a camera parameter including a focal length and a coordinate of a principal point may be obtained from stereo camera setting information.

Here, the principal point may be the center of a photograph, and may refer to a meeting point of a vertical line which is drawn from a projection center to a projection surface and the projection surface.

Further, the focal length may refer to a distance which is from the principal point to the focal point.

A distance value corresponding to each disparity level may be calculated through the camera parameter (790).

According to an embodiment of the present invention, a disparity value may be calculated using the focal length and the coordinate of the principal point included in the obtained camera parameter.

A relationship between the distance z which is from a virtual horizontal axis camera to a pixel on an object and the disparity value d may be expressed by Equation 1 using the focal length f of the virtual horizontal axis camera and the distance B (mm as a unit) between principal points of two cameras.

A pixel expected ratio for each disparity level may be generated through the distance value corresponding to each disparity level (800).

According to an embodiment of the present invention, an expected intensity ratio of a pixel may be generated according to distance for each disparity level according to the disparity value.

According to an embodiment of the present invention, the expected ratio $E(I_d)$ of the pixel value $I_d$ for each disparity value d may be calculated by Equation 2 using the distance corresponding to the disparity level and to generate the expected intensity ratio of the pixel according to distance for each disparity level.

A general cost volume value may be calculated (810).

According to an embodiment of the present invention, the cost volume may be calculated using a constant parameter which is previously set for the image received with the general cost volume calculation command.

According to an embodiment of the present invention, the cost volume may be calculated by Equation 3 through a support weight method for each pixel using a bilateral filter in order to calculate the cost volume using the constant parameter.

According to an embodiment of the present invention using a general cost volume calculation method, a color difference parameter $\sigma_r$ may be a specific value which is previously set and may be used a constant value regardless of the disparity level.

A cost volume value for each level may be calculated through the received expected intensity ratio (820).

According to an embodiment of the present invention, the cost volume may be calculated using different parameters for each disparity level using the expected intensity ratio of the pixel according to distance for each disparity level on the image received with the per-level cost volume calculation command.

According to an embodiment of the present invention, the cost volume may be calculated by Equation 3 through a support weight method for each pixel using a bilateral filter to calculate the cost volume using different parameters for each disparity level.

Here, in comparison to a general cost volume calculation method, a color difference parameter $\sigma_r$ may be applied differently as a function $\sigma_r(d)$ according to the disparity level.

According to an embodiment of the present invention, the equation shown in Equation 4 may be used as the function $\sigma_r(d)$.

Referring to Equation 4, $\sigma_r(d)$ may basically be proportional to the expected intensity ratio (0 to 1) of the pixel.

Further, when using a cost plane in which the disparity value is 0, since the disparity value of 0 corresponds to a distance which is considerably distant even when considering $d_{comp}$, pixels matched by the disparity value may have a very low pixel value on average, and a difference of pixel values of different objects which are located distantly may be considerably small.

Further, according to an embodiment of the present invention, $\sigma_{optimal}$ may be an optimal value for the object which is located distantly which is mainly used.

When substituting Equation 4 into Equation 3, a weight of a raw cost value C(q,d) between p and an adjacent point q may be greatly reflected even in a small value of $|I_p-I_q|$ when the disparity value is small, and a slight difference between objects which rapidly darken may be precisely reflected as a distance from a light source increases.

According to the embodiment of using the per-level cost volume calculation method, a high identification rate may be obtained even when the disparity value is great since aggregating a cost plane having a great disparity is an operation of identifying an object located in a nearby position and an expected intensity ratio pixels which are matched is increased.

The above-described embodiments of the present invention may not be implemented by only the apparatus and/or method of the present invention described above. While the above-described embodiments of the present invention are described in detail, the scope of the present invention is not limited thereto, and various changes and modifications using the concept of the present invention are also included in the scope of the appended claims.

What is claimed is:

1. An apparatus for calculating a cost volume in a stereo matching system including an illuminator comprising:
    an illuminator controller configured to calculate a pixel intensity ratio of a received stereo image, compare the pixel intensity ratio and a predetermined intensity ratio, generate a general cost volume calculation command or a per-disparity level cost volume calculation command, and controls the illuminator;
    a pixel expected ratio calculator configured to obtain a camera parameter by performing a camera calibration, calculate a disparity value through the obtained camera parameter, and generate an expected intensity ratio of a pixel according to distance for each disparity level from the calculated disparity value; and
    a cost volume calculator configured to apply a predetermined parameter or different parameters for each disparity level based on the expected intensity ratio of the pixel according to distance for each disparity level according to the received cost volume calculation command for the received image, and calculate a cost volume value.

2. The apparatus for calculating a cost volume in a stereo matching system including an illuminator of claim 1, wherein the illuminator controller further comprises:
    a first comparison controller configured to calculate the pixel intensity ratio of the received image, compare the calculated pixel intensity ratio and the predetermined intensity ratio, control a use of the illuminator when the calculated pixel intensity ratio is smaller than the predetermined intensity ratio, and transmit the general cost volume calculation command and a captured image when the calculated pixel intensity ratio is greater than the predetermined intensity ratio; and
    a second comparison controller configured to receive an image obtained after using the illuminator when the illuminator is used, calculate a pixel intensity ratio of the received image, compare the calculated pixel intensity ratio and the predetermined intensity ratio, transmit the per-disparity level cost volume calculation command and the received image when the calculated pixel intensity ratio is smaller than the predetermined intensity ratio, and transmit the general cost volume calculation command and the received image when the calculated pixel intensity ratio is greater than the predetermined intensity ratio.

3. The apparatus for calculating a cost volume in a stereo matching system including an illuminator of claim 1, wherein the cost volume calculator further comprises:
    a general cost volume calculator configured to calculate the cost volume by applying a predetermined constant parameter for the image received together with the general cost volume calculation command; and
    a per-level cost volume calculator configured to calculate the cost volume by applying different parameters for each disparity level using the expected intensity ratio of the pixel according to the distance for each disparity level received for the image received together with the per-level cost volume calculation command.

4. The apparatus for calculating a cost volume in a stereo matching system including an illuminator of claim 1, wherein the pixel expected ratio calculator further comprises:
    a parameter acquisitor configured to obtain a camera parameter including a focal length and a coordinate of a principal point from stereo camera setting information;
    a disparity calculator configured to calculate the disparity value using the focal length and the coordinate of the principal point included in the obtained camera parameter; and
    an expected intensity ratio generator configured to generate the expected intensity ratio of the pixel according to distance for each disparity level through the disparity value.

5. A method for calculating a cost volume in a stereo matching system including an illuminator comprising:
    calculating a pixel intensity ratio of a received stereo image, comparing the calculated pixel intensity ratio and a predetermined intensity ratio, generating a general cost volume calculation command or a per-disparity level cost volume calculation command, and controlling the illuminator;
    obtaining a camera parameter by performing a camera calibration, calculating a disparity value through the obtained camera parameter, and generating an expected intensity ratio of a pixel according to distance for each disparity level from the calculated disparity value; and
    applying a predetermined parameter or different parameters for each disparity level based on the expected intensity ratio of the pixel according to distance for each disparity level according to the received cost volume calculation command for the received image for the received image, and calculating a cost volume value.

6. The method for calculating a cost volume in a stereo matching system including an illuminator of claim 5, wherein the controlling of the illuminator further comprises:
    calculating a pixel intensity ratio of the received image, comparing the calculated pixel intensity ratio and the predetermined intensity ratio, controlling use of the illuminator when the calculated pixel intensity ratio is smaller than the predetermined intensity ratio, and transmitting the general cost volume calculation command and a captured image when the calculated pixel intensity ratio is greater than the predetermined intensity ratio; and
    receiving an image obtained after using the illuminator when the illuminator is used, calculating a pixel intensity ratio of the received image, comparing the calculated pixel intensity ratio and the predetermined intensity ratio, transmitting the per-disparity level cost volume calculation command and the received image when the calculated pixel intensity ratio is smaller than the predetermined intensity ratio, and transmitting the general cost volume calculation command and the received image when the calculated pixel intensity ratio is greater than the predetermined intensity ratio.

7. The method for calculating a cost volume in a stereo matching system including an illuminator of claim 5, wherein the calculating of the cost volume value further comprises:
    calculating the cost volume by applying a predetermined constant parameter for the image received together with the general cost volume calculation command; and calculating the cost volume by applying different parameters for each disparity level using the expected intensity ratio of the pixel according to the distance for each disparity level for the image received together with the per-level cost volume calculation command.

8. The method for calculating a cost volume in a stereo matching system including an illuminator of claim 5, wherein the generating of the pixel expected ratio further comprises:

obtaining a camera parameter including a focal length and a coordinate of a principal point from stereo camera setting information;

calculating a disparity value using the focal length and the coordinate of the principal point included in the obtained camera parameter; and generating the expected intensity ratio of the pixel according to distance for each disparity level through the disparity value.

* * * * *